(12) United States Patent
Fabre et al.

(10) Patent No.: US 7,837,106 B2
(45) Date of Patent: Nov. 23, 2010

(54) SYSTEM FOR COLLECTING AND AUTOMATICALLY CHECKING ORDERED ARTICLES

(75) Inventors: Bruno Fabre, Cavaillon (FR); Guy Venture, Senas (FR)

(73) Assignee: NEOPOST Technologies, Bagneux (FR)

( * ) Notice: Subject to any disclaimer, the term of this patent is extended or adjusted under 35 U.S.C. 154(b) by 1567 days.

(21) Appl. No.: 10/733,417

(22) Filed: Dec. 11, 2003

(65) Prior Publication Data
US 2004/0144843 A1 Jul. 29, 2004

(30) Foreign Application Priority Data
Dec. 13, 2002 (FR) .................................. 02 15797

(51) Int. Cl.
G06F 19/00 (2006.01)
G06F 17/00 (2006.01)
(52) U.S. Cl. ........................ 235/385; 235/375
(58) Field of Classification Search ................ 235/375, 235/385; 209/569
See application file for complete search history.

(56) References Cited
U.S. PATENT DOCUMENTS

| | | | | |
|---|---|---|---|---|
| 3,771,679 A | * | 11/1973 | Theml | 414/807 |
| 4,850,009 A | | 7/1989 | Zook et al. | 379/96 |
| 5,441,158 A | * | 8/1995 | Skinner | 209/583 |
| 5,660,261 A | | 8/1997 | Speckhart et al. | |
| 5,687,850 A | * | 11/1997 | Speckhart et al. | 209/2 |
| 5,962,834 A | * | 10/1999 | Markman | 235/385 |
| 6,148,291 A | * | 11/2000 | Radican | 705/28 |
| 6,747,560 B2 | * | 6/2004 | Stevens, III | 340/572.4 |
| 7,040,532 B1 | * | 5/2006 | Taylor et al. | 235/375 |
| 7,061,379 B2 | * | 6/2006 | Chen et al. | 340/572.1 |
| 7,069,100 B2 | * | 6/2006 | Monette et al. | 700/116 |

FOREIGN PATENT DOCUMENTS

| | | |
|---|---|---|
| DE | 3711237 A1 | 10/1988 |
| DE | 19526131 A1 | 1/1997 |
| EP | 0732278 A1 | 9/1996 |
| EP | 1179490 A1 | 2/2002 |
| GB | 2371531 | 7/2002 |
| WO | WO 02/07084 A1 | 1/2002 |

OTHER PUBLICATIONS

"Garment Sortation and Cold Store Contract", Database Inspec 'en Ligne!, Institute of Electrical Engineers, Stevenage, GB, vol. 26, No. 10, p. 62.

* cited by examiner

*Primary Examiner*—Jamara A Franklin
(74) *Attorney, Agent, or Firm*—Sughrue Mion, PLLC

(57) ABSTRACT

This invention relates to a mobile device for collecting and validating collected articles, each equipped with a transponder and including rollers for moving along a runway in a predetermined path, a horizontal beam for receiving the articles collected during this displacement one by one, a radio-frequency interrogator for obtaining identifying information on each of the articles collected by the device and a comparator for comparing the identifying information obtained with references relative to a determined order for articles and thus for validating the collected articles as they are collected along the runway.

20 Claims, 3 Drawing Sheets

SYSTEM FOR COLLECTING AND AUTOMATICALLY CHECKING ORDERED ARTICLES

BACKGROUND OF THE INVENTION

1. Field of the Invention

The present invention relates to the domain of logistics and the conveyance of various articles, and more particularly to the collection of articles stored in general stores, warehouses or workshops with a view to dispatch thereof.

2. Brief Description of Related Developments

The operations of collecting and handling articles in workshops with a view to dispatch thereof raise numerous problems, particularly when it is question of operating rapidly and without errors. When these articles are cumbersome and fragile, such as for example in the garment trade, it is known to collect them and convey them in the workshop by means of mobile carriages adapted to move along a runway fixed to the ceiling of the workshop and circulating between the different rows of garments in this workshop. These carriages or "baskets" are pushed, or more often pulled, manually by agents by means of a rigid draw rod connected to each carriage or group of carriages. More rarely, these carriages are individually motorized by an electric or hydraulic motor conventionally controlled from the floor by a suspension chain or push-button box.

At the present time, when an order for garments is to be processed, the agent in charge of collecting these garments in the workshop (also called picking hall), where they are stored among thousands of others as a function of their particular characteristics (trademark, design, size, colour, etc.), follows a one-way circuit, and, in accordance with a previously filled in work sheet, successively stops in front of the predetermined rows of garments corresponding to the order to be satisfied. At each of these stops, each garment selected is taken out of its rack and suspended by hooking on the carriage. At the end of the course, the garments are removed from the carriage and directly packed for dispatch to the addressee of the order thus processed.

Now, in practice, and sometimes unfortunately only once the parcel has arrived at the addressee's location, errors or articles missing with respect to the initial order are often observed.

It is an object of the present invention to overcome these drawbacks by proposing a system for collecting and automatically checking an order before it is dispatched, which is both simple and economical.

SUMMARY OF THE INVENTION

These objects are attained by a mobile device for collecting and validating collected articles, each equipped with a transponder and comprising a moving device for moving along a runway in a predetermined path and a receiver for receiving the articles collected during this displacement one by one.

The mobile device further comprises a radio-frequency (RF) interrogator for obtaining identifying information on each of the articles collected by the device and a comparator for comparing the identifying information obtained with references relative to a determined order for articles and thus for validating the collected articles as they are collected along the runway.

In this way, by employing the identifying transponders fitted to all garments, it is possible to guarantee that the addressee's order is exact by detecting any error of collection made by the agent as soon as the garment has been hooked.

The radio-frequency interrogator comprises an RF antenna coupled to an electronic module for processing the identifying information issuing from the transponders. The electronic module comprises a memory for storing the references relative to a determined order for articles and the comparator for comparing these references with the identifying information issuing from the transponders.

The RF antenna and the receiver for receiving the collected articles preferably form a single integrated module.

This electronic module advantageously further comprises a short range transceiver (preferably of radio, Bluetooth or WiFi type) for receiving from a remote data-processing assembly the references relative to a determined order for articles.

According to a preferred form of embodiment, the device may comprise a detachable electronic module comprising a memory for storing said references relative to a determined order for articles, the comparator for comparing these references with the identifying information issuing from the transponders, and a short range transceiver (preferably of infrared type) for receiving said references relative to a determined order for articles from a remote data-processing assembly. Advantageously, it further comprise an electrical connector for connection with an immediately adjacent device.

The present invention also relates to a system for collecting and checking orders for articles comprising a data-processing assembly for managing orders for articles and a plurality of devices for collecting and validating collected articles.

BRIEF DESCRIPTION OF THE DRAWINGS

The invention will be more readily understood on reading the following description with reference to the accompanying drawings, in which.

DETAILED DESCRIPTION OF THE PREFERRED EMBODIMENT(S)

Figure 1:
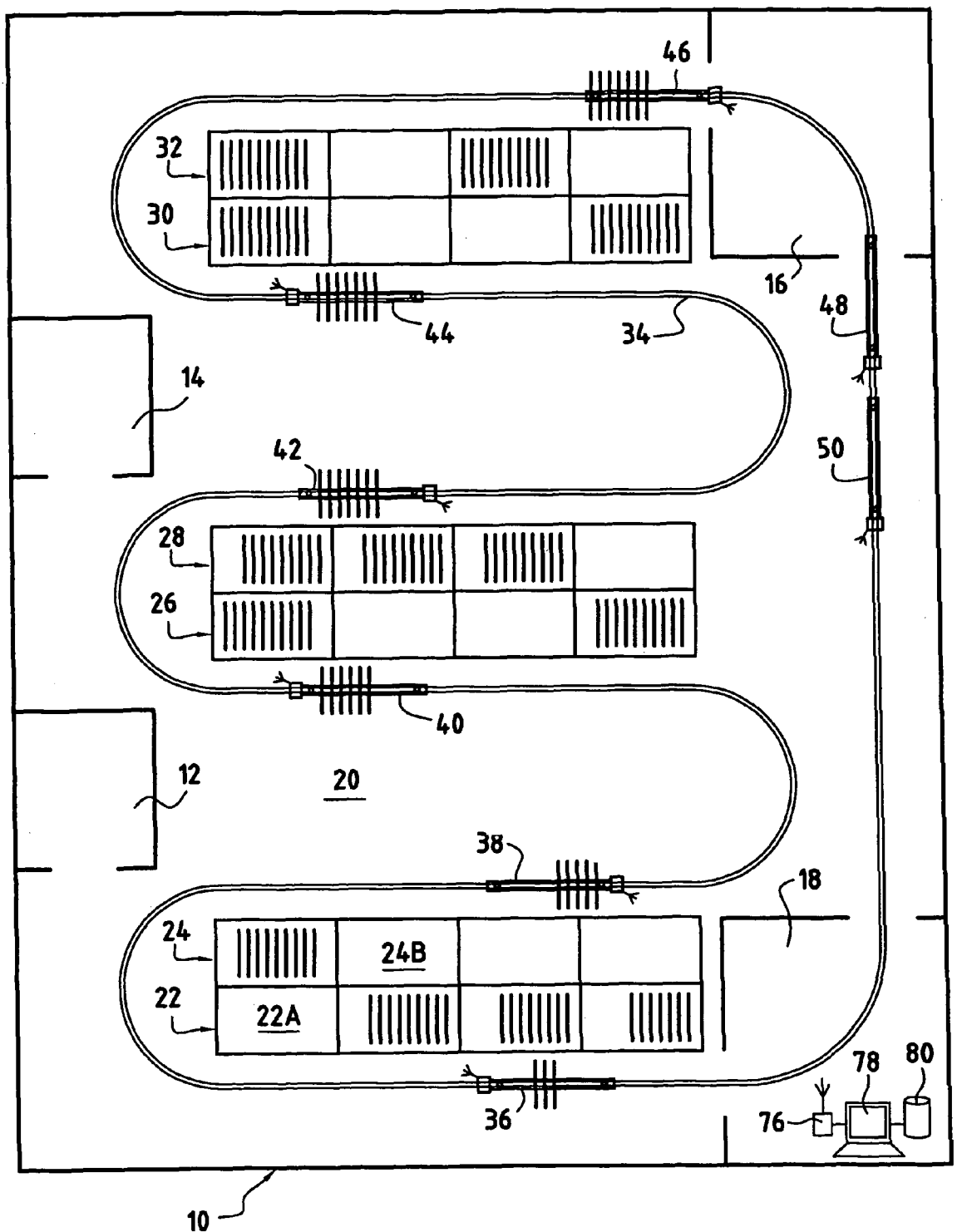
FIG. 1 schematically shows a workshop for storing garments.

Referring now to the drawings, a workshop for storing garments is shown very schematically in FIG. 1. This workshop 10 comprises administrative offices, for example 12, 14, 16, 18, and a large hall (picking hall) 20 in which the garments are stored after manufacture. This hall is constituted by a plurality of rows (for example 22, 24, 26, 28, 30, 32) of clothes rails 22A, 24B, etc. Winding between these rows and fixed to the ceiling of the workshop there is arranged a closed runway 34 from which are suspended a plurality of carriages 36, 38, 40, 42, 44, 46, 48, 50 or "baskets" intended to receive the garments collected by agents when they are processing orders. This one-way runway preferably traverses the whole workshop and passes in front of all the clothes rails so as to allow any of the garments stored in the workshop to be collected. It passes through an unloading area, area 16 in the present case, where the garments are removed from the carriage in order to be packed before being dispatched to their addressee.

Figure 2:
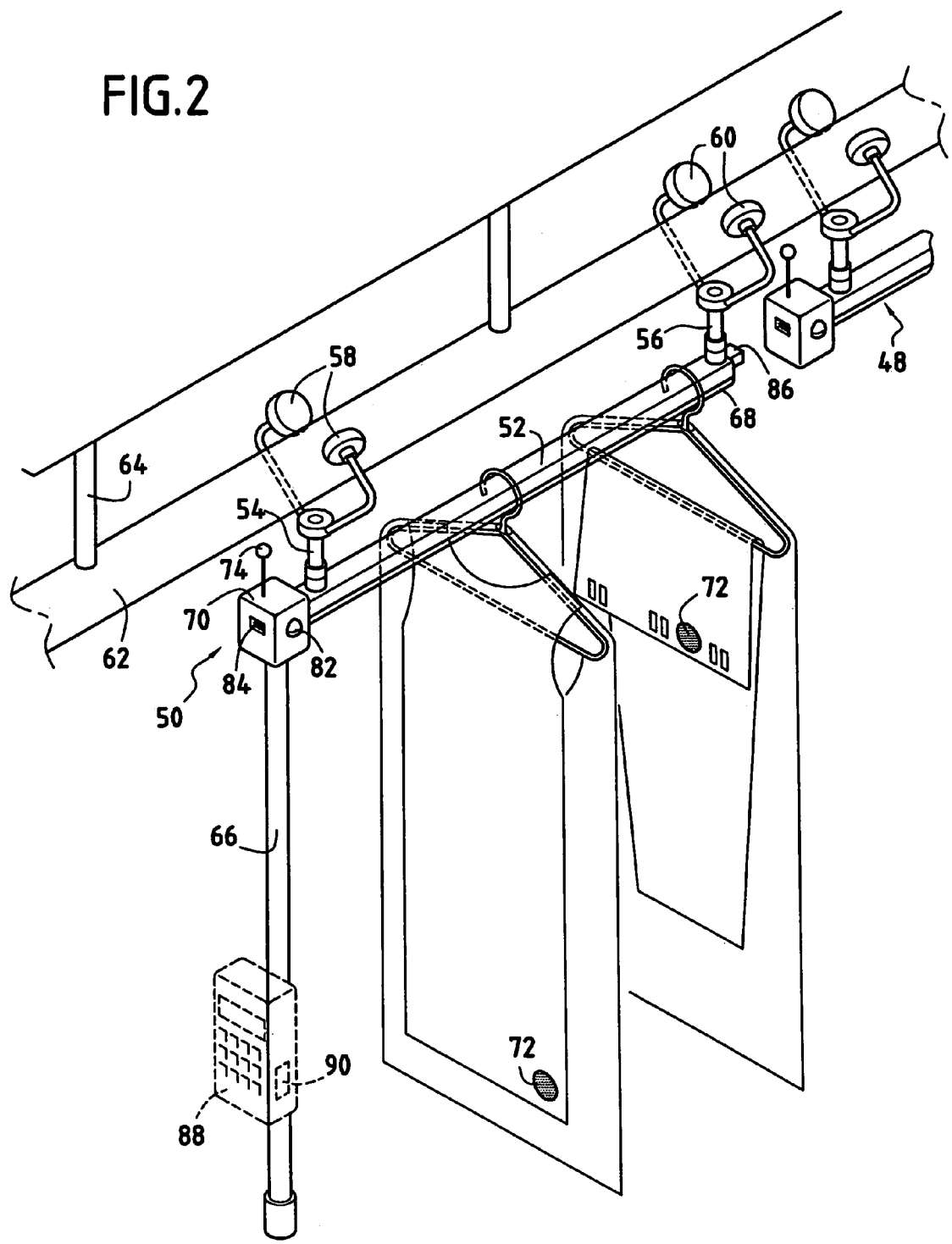
FIG. 2 shows an example of carriage according to the invention on which the garments collected by an agent are hooked.

FIG. 2 shows a first example of carriage 50 used for collecting garments from the workshop of FIG. 1. Each carriage is formed by a horizontal beam 52 comprising two supports 54, 56 fixed at each of its two ends, each support comprising rollers 58, 60 adapted to move along the runway or rail 62 fixed to the ceiling of the workshop by any suitable means of attachment 64. The carriage is further provided with a draw rod 66 to allow it to be displaced over the rail by an agent.

At the present time, all garments are fitted, as soon as they are manufactured, with radio-frequency emitter/receivers (RFID tags) which are embedded in these garments at different levels and which serve both to identify the garments in the store (for stock management, renewals, and for the store's analytical accounts) and to serve as protection against theft in these stores. These miniaturized transponders may, for example, be integrated in a lining, a lapel, a pocket, a button, or a label, and include in an integrated memory, information for identification of the garments in which they are incorporated, relative for example to the trademark, design, size, colour, etc . . .

The present invention proposes to exploit the presence of these transponders on each of the garments stored in the workshop by producing a collection and order-checking system which is simple and economical, on the basis of a process of identification of each garment collected. This guarantees that the addressee's order is processed without error and without any forgotten articles. To that end, each garment collecting carriage is provided with an RF interrogator 68, 79 intended to cooperate with the transponders 72 embedded in each of the garments stored in the workshop, so as to allow the garments collected to be identified and checked off against the addressee's order.

These interrogators comprise a transceiver formed by one or more antennas 68 especially adapted to RFID emissions, for example of parabolic, rectangular wave guide or planar array type, directly integrated in the beam 52 or forming a part thereof. U.S. Pat. No. 6,184,841 shows an example of a planar antenna with multiple elements allowing a detection over a distance of up to 5 meters. This RF antenna is coupled to a self-supplied electronic module 70 comprising, as is known, an RF source and electronic components (supply, modulator, detector, converter, processing unit) necessary for remote supply of the transponders and for processing the identifying information exchanged between the electronic module 70 and the transponders 72. The electronic module further comprises at the level of its processing unit a comparator for comparing the identifying information obtained from the transponders with references relative to a determined order for articles previously stored in memory means of the processing unit (or outside the latter) intended to store these references, and thus validate the collected articles as they are being collected along the runway.

According to the configuration envisaged, the RF antenna may also serve as relay for a master emitter/receiver, as is described in U.S. Pat. No. 5,936,527, directly connected to a personal computer (or general-use micro-computer) ensuring the management of the workshop. However, in the configuration illustrated, the electronic module 70 integrates a short range transceiver 74, (of Bluetooth or WiFi type for example), to retransmit the information received from the transponders towards a remote data-processing assembly comprising the computer managing the workshop, and a base module 76 including a similar short range transceiver and connected to the computer. This computer 78 is also connected to a data base 80 containing all the references relative to the garments stored in the workshop and it may comprise software code configured to compare the identifying information obtained from the transponders with references relative to a determined order for articles available in the data base. This serves as a check between the garments collected by an agent and the corresponding order when the comparator is not already integrated in the electronic module 70. Visual or audible indicator 82 is further provided at the level of the electronic modules of each of the carriages to indicate an error in collection to the agent.

In addition, while an order is being processed, an agent may estimate that the use of a single carriage is insufficient to collect all the garments relative to this order and therefore decide for example to use two or more. This is why carriage 50 is advantageously provided at its two ends with an electrical connector 84, 86 to allow a power and data link with an immediately adjacent upstream or downstream carriage 48.

In a preferred form of embodiment, the short range transceiver 74 is not a part of the electronic module 70 of each carriage but is instead integrated directly in a detachable electronic device 88 (for example, an organizer, personal assistant, or graphic tablet) allocated to each agent and which is connected to the carriage during the collection (for example, via an electrical connector (not shown) present on the draw rod 66). Due to the portable nature of the device, these short range transceiver 90 may advantageously be infrared, for example of Firewire type. This portable electronic device includes a screen on which the agent can thus visualize his order which will have been previously recorded in the device from the management computer 78. In that case, it may advantageously also integrate the visual and/or audible indicator as well as the comparator when the latter is not integrated in the electronic module 70.

Figure 3:
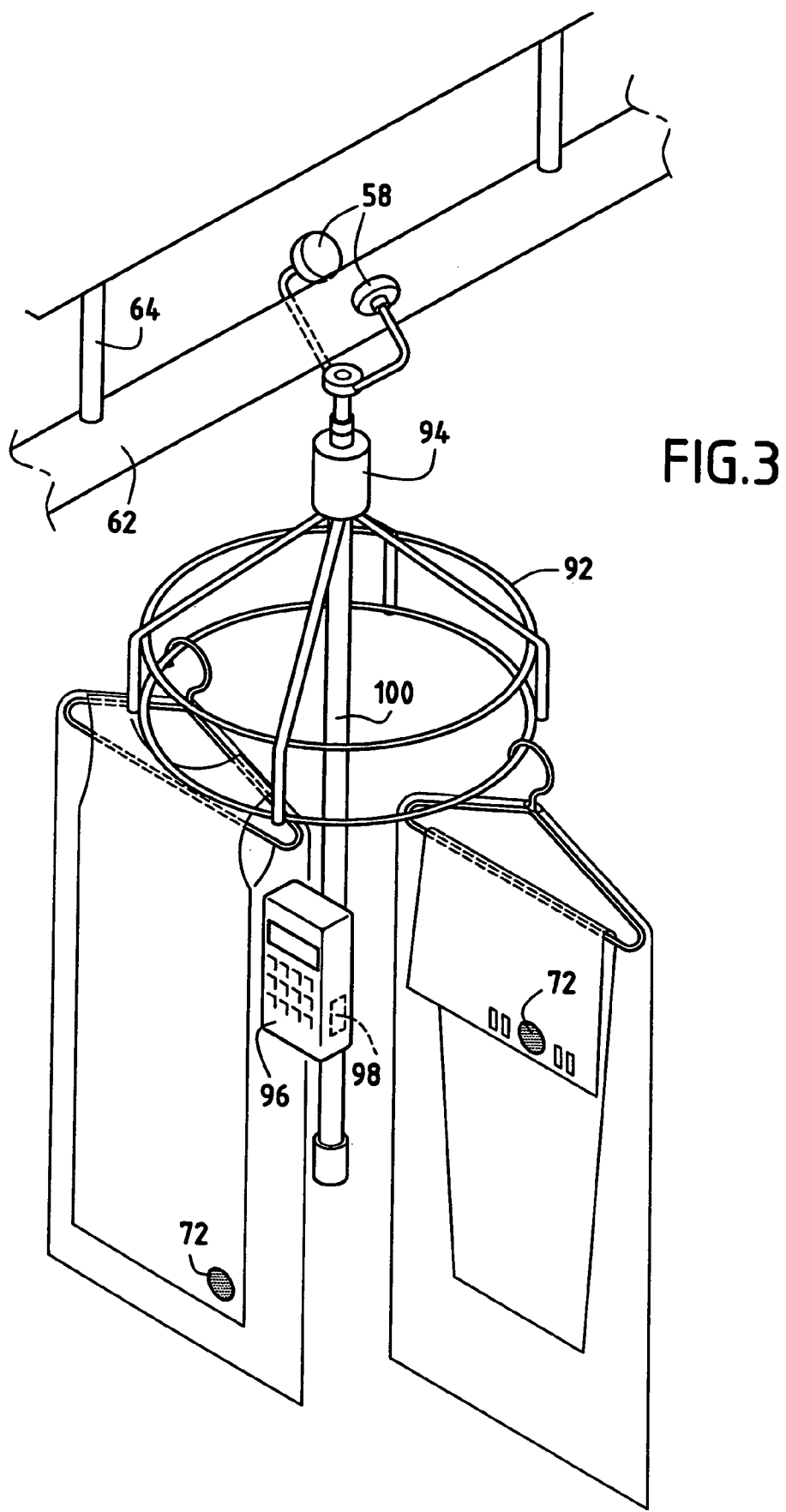
FIG. 3 shows an example of basket according to the invention on which the garments collected by an agent are hooked.

A second example of the invention is illustrated in FIG. 3 in which the garment conveying carriage is in the form of a basket 92 forming RF antenna for the emission/reception means. This RFID antenna is coupled to a self-supplied electronic module 94 comprising, as indicated hereinabove, the RF source and the electronic components (supply, modulator, detector, converter, processing unit) necessary for the remote supply of the transponders and for processing the identifying information exchanged between this electronic module 94 and the transponders 72. In this example, the processing unit of the electronic module does not include the comparator which is offset in a detachable electronic device 96 (for example, an organizer, personal assistant or graphic tablet) allocated to each agent, which is connected to the basket during collection (for example via an electrical connector (not shown) present on a push rod 98 of this basket), and which contains the references relative to a determined order for articles previously stored in its memory (by its infrared link 100) making it possible to validate the collected articles as they are collected along the runway.

The system according to the invention functions as follows: Operation differs depending on whether the agent processes his order with or without a portable device. In the absence of a portable device, the agent receives a paper worksheet on which are listed garments to be collected, with their location in the workshop marked by a row number and a clothes rail reference, these garments being in a determined order corresponding to the one-way direction of displacement of the carriage on the runway. In parallel, similar information available in the management computer 78 and which was entered via the keyboard or transmitted thereto through an internal network of the workshop or, better still, via an external network in direct link with the stores (of the Intranet type for example), is transmitted by the short range link 76, 74 to a determined collecting carriage and stored in the internal memory of its electronic module 70 (this type of functioning is not possible with the second form of embodiment, the portable device not having such a link). When the agent has a portable device, the order to be processed is loaded directly from the management computer (for example via its infrared link) into this device which is then connected by the agent on a determined carriage or basket, this link ensuring the automatic loading of the information relative to the order in the internal memory of the electronic module 70 of this carriage.

Collection proper can then commence. It is now effected indifferently, whether the order is followed by reading the worksheet or the screen of the portable device. The agent will therefore pull his carriage or basket up to the first storage location indicated on his sheet or screen, take the referenced garment and then hang it on his carriage or basket. This positioning of the garment will, simply by its presence in the field of action of the emitter 68 of the carriage or basket 92, bring about an immediate and automatic recognition of the transponder 72 that it carries and of which the information will be able to be transferred and compared with that of the order at the level of the electronic module 70, 94. In the event of error, i.e. a comparison with negative result, the visual or audible indicator 82 is activated, indicating to the agent that he mistook the garment. In that case, he will be able, without waiting, to withdraw it from the carriage or basket and replace it with the correct garment. On the contrary, an absence of visual or audible indication will mean that the garment collected is the right one and he may then continue to collect the following garments on the list until his order is finished.

It will be noted that, as the garments forming a given order are stored in a determined order (order of their collection) in the memory of the electronic module, the comparison of the garments is effected in the same order and it is therefore possible to detect articles possibly missed out when the result of the comparison is negative. In the form of embodiment employing the portable device, the missed out article may advantageously be underlined or highlighted on the screen of the device.

In this way, by using the transponders already present in the garments, it becomes possible to guarantee for the addressees that their order is processed without error nor articles missed out. Moreover, the system is very simple to install since it suffices to add to the existing collecting carriages or baskets known RF emission/reception means in order to interrogate the transponders, and to link these interrogation means with the computer system managing the orders, as explained, to check the validity of the collection.

It will be noted that, although the aforementioned description has been given essentially with regard to garments, it may, of course, be applicable to any other type of articles each equipped with a transponder and able to be stored in a workshop or warehouse and collected by means of a mobile collecting device of the carriage or basket type, whether such device be suspended from the ceiling of the workshop as described or simply pushed along a rail on the ground.

What is claimed is:

1. A mobile device for collecting and validating collected articles, each article equipped with a transponder, the mobile device comprising:
    means for moving along a runway in a predetermined path;
    a receiving means for receiving and supporting the collected articles while moving along the runway in the predetermined path;
    a radio-frequency (RF) interrogation means for obtaining identifying information on each of the articles collected by the device; and
    comparison means for comparing the identifying information obtained with references relative to a determined order for articles and thus for validating the collected articles as the articles are collected along the runway.

2. The device of claim 1, wherein said RF interrogation means comprise an RF antenna coupled to an electronic module for processing the identifying information issuing from transponders.

3. The device of claim 2, wherein said RF antenna and said means for receiving the collected articles form a single integrated module.

4. The device of claim 2, wherein said electronic module comprises memory means for storing said references relative to a determined order for the articles and said comparison means for comparing said references relative to the determined order with the identifying information issuing from the transponders.

5. The device of claim 4, wherein the mobile device further comprises a detachable electronic module comprising short range emission/reception means for receiving said references relative to the determined order for the articles from a remote data-processing assembly.

6. The device of claim 2, wherein said electronic module further comprises short range emission/reception means for receiving from a remote data-processing assembly said references relative to the determined order for the articles.

7. The device of claim 6, wherein said short range emission/reception means are of radio, Bluetooth or WiFi type.

8. The device of claim 2, wherein the mobile device further comprise a detachable electronic module comprising memory means for storing said references relative to the determined order for the articles, said comparison means for comparing said references relative to the determined order for the articles with the identifying information issuing from the transponders, and short range emission/reception means for receiving said references relative to the determined order for the articles from a remote data-processing assembly.

9. The device of claim 8, wherein said short range emission/reception means are of infrared type.

10. The device of claim 1, wherein the mobile device further comprise means for electrical connection with an immediately adjacent device.

11. System for collecting and checking orders for articles comprising a data-processing assembly for managing orders for articles and a plurality of devices for collecting and validating collected articles, according to claim 1.

12. A mobile device for collecting and validating collected articles, each article equipped with a transponder, the mobile device comprising:
    a guide portion for moving the mobile device along a runway in a predetermined path;
    a receiving portion configured to receive and support the collected articles while moving along the runway in the predetermined path;
    a radio-frequency (RF) interrogation device that obtains identifying information on each of the articles collected by the mobile device; and
    a comparison unit that compares the identifying information obtained from the transponder with a predetermined order for articles.

13. The device of claim 12, wherein said RF interrogation device comprises an RF antenna coupled to an electronic module for processing the identifying information issuing from transponders.

14. The device of claim 13, wherein said RF antenna and said receiving portion form a single integrated module.

15. The device of claim 13, wherein said electronic module comprises a memory that stores said references relative to the predetermined order for the articles and said comparison unit that compares the identifying information obtained with a predetermined order for articles.

16. The device of claim 15, wherein the mobile device further comprises a detachable electronic module comprising a short range emission/reception device that receives said references relative to the predetermined order for the articles from a remote data-processing assembly.

17. The device of claim 13, wherein said electronic module further comprises a short range emission/reception device that receives from a remote data-processing assembly said references relative to the predetermined order for the articles.

18. The device of claim 17, wherein said short range emission/reception device is of a radio, Bluetooth or WiFi device.

19. The device of claim 13, wherein the mobile device further comprise a detachable electronic module comprising a memory that stores said references relative to the predetermined order for the articles, said a comparison unit that compares the identifying information obtained from the transponder with a predetermined order for articles, and a short range emission/reception device that receives said references relative to the predetermined order for the articles from a remote data-processing assembly.

20. The device of claim 19, wherein said short range emission/reception device is an infrared device.

* * * * *